US012117852B2

(12) United States Patent
Shichi et al.

(10) Patent No.: US 12,117,852 B2
(45) Date of Patent: Oct. 15, 2024

(54) GAS GOVERNOR

(71) Applicant: RINNAI CORPORATION, Aichi (JP)

(72) Inventors: Kazuyuki Shichi, Aichi (JP); Kunio Kataoka, Aichi (JP)

(73) Assignee: RINNAI CORPORATION, Aichi (JP)

( * ) Notice: Subject to any disclaimer, the term of this patent is extended or adjusted under 35 U.S.C. 154(b) by 0 days.

(21) Appl. No.: 18/351,799

(22) Filed: Jul. 13, 2023

(65) Prior Publication Data
US 2024/0077894 A1    Mar. 7, 2024

(30) Foreign Application Priority Data

Sep. 6, 2022   (JP) .................................. 2022-141153

(51) Int. Cl.
  *G05D 16/16*   (2006.01)
(52) U.S. Cl.
  CPC .................................. *G05D 16/163* (2013.01)
(58) Field of Classification Search
  CPC .......................... G05D 16/163; G05D 16/2022
  See application file for complete search history.

(56) References Cited

U.S. PATENT DOCUMENTS

| | | | | |
|---|---|---|---|---|
| 126,444 | A | * 5/1872 | Chameroy | G05D 16/163 137/489 |
| 4,930,747 | A | * 6/1990 | Nakamura | F16K 31/0655 251/129.17 |
| 4,966,188 | A | * 10/1990 | Fischer | G05D 16/163 137/489 |
| 5,020,771 | A | * 6/1991 | Nakatsukasa | F23N 1/007 251/129.08 |
| 11,953,098 | B2 * | 4/2024 | Ernst | F16K 1/52 |

FOREIGN PATENT DOCUMENTS

JP        6-159654 A    6/1994

* cited by examiner

*Primary Examiner* — Eric Keasel
(74) *Attorney, Agent, or Firm* — Future IP LLC; Tomoko Nakajima

(57) ABSTRACT

In a gas governor, an auxiliary chamber divided by a separating wall from a main chamber that is a portion of the secondary pressure chamber is provided in the secondary pressure chamber, the auxiliary chamber communicates with the main chamber through a communicating passage, the separating wall is positioned at a portion away in a circumferential direction from an outflow-port opened portion that is a peripheral wall portion of the secondary pressure chamber, in which the outflow port is opened, and the separating wall is provided so that a distance from a valve hole and a curvature in the circumferential direction of at least an end portion of the separating wall, which is close to the valve seat, are equal to those of an end portion of the outflow-port opened portion, which is close to the valve seat.

4 Claims, 4 Drawing Sheets

GAS GOVERNOR

TECHNICAL FIELD

The invention relates to a gas governor that is interposed in a gas supply passage for a gas burner.

BACKGROUND ART

Originally, the gas governor of this kind includes a casing having an inflow port and an outflow port, a primary pressure chamber communicating with the inflow port, a secondary pressure chamber communicating with the outflow port, and a valve seat between the primary pressure chamber and the secondary pressure chamber, a diaphragm facing to the primary pressure chamber at an opposite side to the valve seat, and a governor valve that has a valve body part which is inserted into a valve hole opened in the valve seat and of which a diameter is progressively enlarged toward an end part of a side of the secondary pressure chamber. In the gas governor, an axis part of the governor valve, which extends from the valve body part to a side of the diaphragm, is connected to the diaphragm. The gas governor is configured that fluctuation of a gas pressure in the secondary pressure chamber, i.e., fluctuation of a secondary gas pressure, is suppressed by displacing the governor valve through the diaphragm corresponding to gas pressure fluctuation in the primary pressure chamber.

Incidentally, in the above-mentioned gas governor, exterior impact and the like trigger off oscillation of the governor valve and, due to this oscillation, the valve body part comes into contact with the valve seat and this contact leads to a sound source. A noise, so-called governor sound, sometimes takes place due to a resonance action resulting from coincidence of a frequency of the sound source with a natural frequency of the secondary pressure chamber. Then, there has been conventionally known a gas governor in which a cylindrical weight that is movably inserted around an outside of the axis part of the governor valve in an axis direction (Patent document No. 1, for example). The above-mentioned gas governor can suppress the governor sound by damping the oscillation of the governor valve using antiphase oscillation of the cylindrical weight. However, there is a defect in thus gas governor that the cylindrical weight is indispensable and increase in cost due to an increase of the number of parts is brought about.

Additionally, there has been conventionally known another gas governor in which a peripheral wall portion of the secondary pressure chamber is outwardly recessed at a portion except a portion in which the outflow port is opened and a volume of the secondary pressure chamber is enlarged. This gas governor is configured that the governor sound is suppressed by shifting the natural frequency of the secondary pressure chamber from the frequency of the above-mentioned sound source. In the gas governor, the number of parts does not increase and this is advantageous in terms of cost reduction.

However, it was revealed that the following defect brings about in the latter gas governor. Specifically, gas flows passing through a clearance between the valve body part of the governor valve and the valve seat becomes slow at a recessed side of the peripheral wall portion with respect to the inflow-port side, further, a vortex(es) takes place in a recessed space of the peripheral wall portion, an influence(s) of the vortex(es) comes in the vicinity of the valve body part of the governor valve, and the gas flows passing through the above-mentioned clearance become unequal in a circumferential direction. As a result, such irregular opening and closing movements as the valve body part of the governor valve opens and closes take place in a state where the valve body part of the governor valve inclines, and the secondary gas pressure becomes instable.

REFERENCE

Patent document No. 1: JPA 1994-159654

SUMMARY OF INVENTION

Technical Problem

In the light of the above-mentioned problem, the invention provides a gas governor that can suppress the governor sound without the increase of the number of the parts and prevents the secondary gas pressure from becoming instable.

Solution to Problem

In order to solve the above-mentioned problem, the invention presupposes a gas governor that includes a casing having an inflow port and an outflow port, a primary pressure chamber communicating with the inflow port, a secondary pressure chamber communicating with the outflow port, and a valve seat between the primary pressure chamber and the secondary pressure chamber; a diaphragm facing to the primary pressure chamber at an opposite side to the valve seat; and a governor valve that has a valve body part which is inserted into a valve hole opened in the valve seat and of which a diameter is progressively enlarged toward an end part of a side of the secondary pressure chamber, wherein an axis part of the governor valve, which extends from the valve body part to a side of the diaphragm, is connected to the diaphragm and gas pressure fluctuation in the secondary pressure chamber is configured to be suppressed by displacing the governor valve through the diaphragm corresponding to gas pressure fluctuation in the primary pressure chamber. In the gas governor, an auxiliary chamber divided by a separating wall from a main chamber that is a portion of the secondary pressure chamber, to which the valve seat faces, is provided in the secondary pressure chamber, the auxiliary chamber communicates with the main chamber through a communicating passage, the separating wall is positioned at a portion away in a circumferential direction from an outflow-port opened portion that is a peripheral wall portion of the secondary pressure chamber, in which the outflow port is opened, and the separating wall is provided so that a distance from the valve hole and a curvature in the circumferential direction of at least an end portion of the separating wall, which is close to the valve seat, are equal to those of an end portion of the outflow-port opened portion, which is close to the valve seat.

According to the invention, since the auxiliary chamber that is divided from the main chamber by the separating wall and communicates with the main chamber through the communicating passage is provided in the secondary pressure chamber, a natural frequency of the secondary pressure chamber becomes high and shifts from the above-mentioned frequency of the sound source. Therefore, the governor sound can be suppressed without the increase of the number of the parts accompanying addition of the conventional cylindrical weight. Additionally, since the distance from the valve hole and the curvature in the circumferential direction of at least the end portion of the separating wall, which is close to the valve seat, are equal to those at the end portion of the outflow-port opened portion, which is close to the valve seat, the gas flows passing through the clearance between the valve body part of the governor valve and the valve seat is equal over an entire circumference. As a result, such the irregular opening and closing movements as the valve body part of the governor valve opens and closes will not take place in the state where the valve body part inclines and instability of the secondary gas pressure will be prevented.

In this connection, in the invention, the communicating passage may be constituted by a clearance between a lid body closing an end surface opposite to the valve seat of the secondary pressure chamber and an end edge of the lid-body side of the separating wall, or by a through hole opened in the separating wall in addition to closure of the above-mentioned clearance.

Additionally, in the case where the communicating passage is constituted by the clearance between the lid body and the end edge of the lid-body side of the separating wall, it is desirable that a position of the end edge of the lid-body side of the separating wall is closer to the lid body than an end of the lid-body side of the outflow port. According to this, the influence(s) of the vortex(es) taking place in the auxiliary chamber is prevented from coming in the vicinity of the valve body part of the governor valve and stability of the secondary gas pressure can be improved.

DESCRIPTION OF EMBODIMENTS

Figure 1:
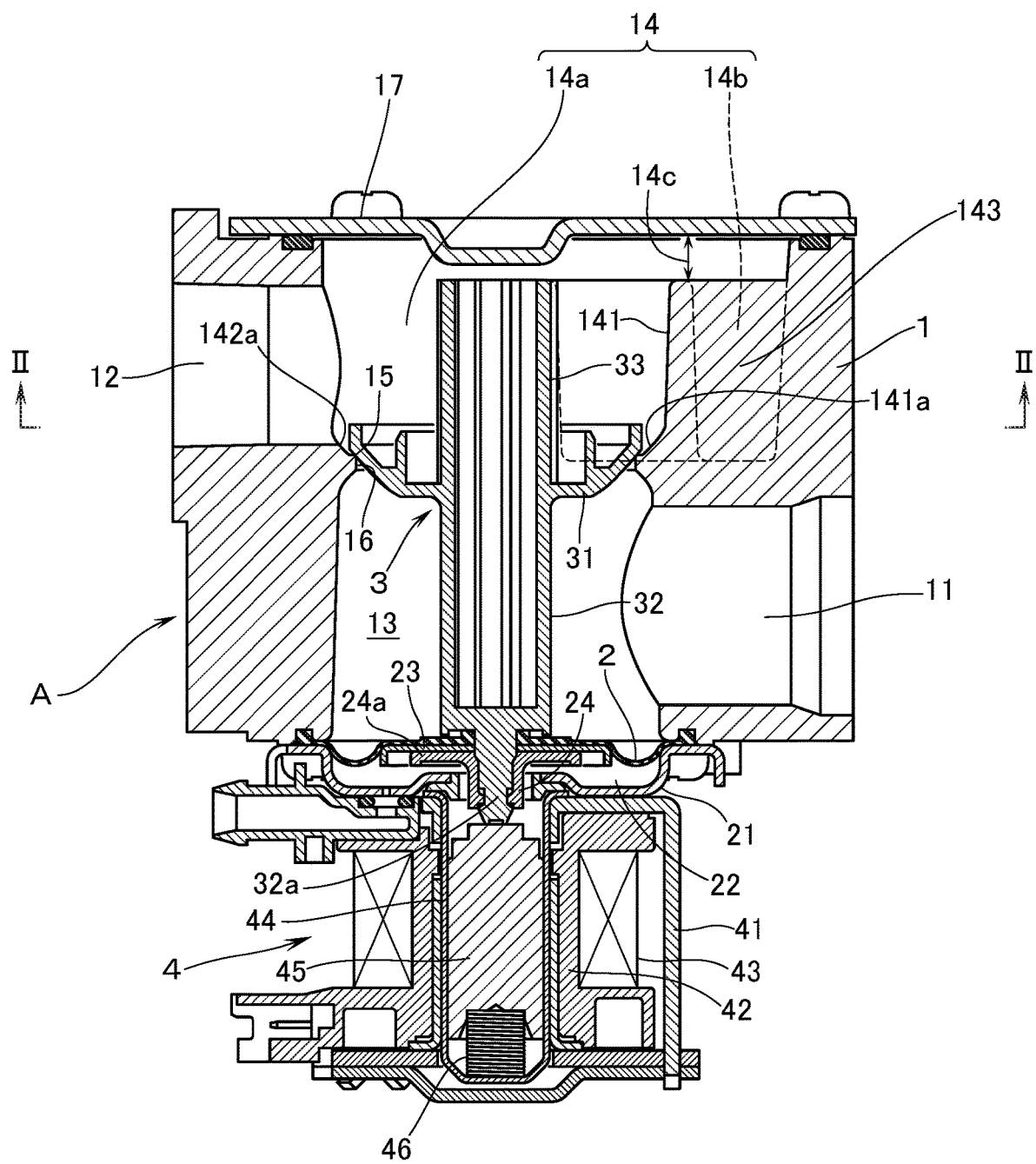
FIG. 1 is a cut-off side view of a proportional valve apparatus with a governor, which is constituted by using a gas governor of a first embodiment of the invention.

FIG. 1 shows a proportional valve apparatus with a governor, which is constituted by using a gas governor A of a first embodiment of the invention. The gas governor A is interposed to a gas supply passage for a gas burner. The gas governor A includes a casing 1 having an inflow port 11 opening in one side surface at a lower portion, an outflow port 12 opening in the other side surface at an upper portion, a primary pressure chamber 13 communicating with the inflow port 11, a secondary pressure chamber 14 positioned above the primary pressure chamber 13 and communicating with the outflow port 12, and a valve seat 15 between the primary pressure chamber 13 and the secondary pressure chamber 14. In the valve seat 15, a valve hole 16 interconnecting the primary pressure chamber 13 and the secondary pressure chamber 14 to each other is opened.

Additionally, the gas governor A includes a diaphragm 2 facing to the primary pressure chamber 13 at an opposite side to the valve seat 15, i.e., at a lower side, and a governor valve 3 connected to the diaphragm 2. Further, in order to constitute the proportional valve apparatus, an electromagnetic solenoid 4 pressing the governor valve 3 to an upper opening-side is provided. An outer circumferential part of the diaphragm 2 is sandwichedly fixed to a lower-surface outer circumferential portion of the primary pressure chamber 13 by a keep plate 21 fastened to a lower surface of the casing 1. A back pressure chamber 22 opened to atmosphere is provided between the diaphragm 2 and the keep plate 21. Additionally, a cylindrical valve holder 24 having a flange part 24a positioned at an upper end, which comes into contact with a lower surface of the diaphragm 2 through a washer 23 is provided at a lower side of the diaphragm 2.

The governor valve 3 has a valve body part 31 that is inserted into the valve hole 16, of which a diameter progressively is enlarged toward an end part of a side of the secondary pressure chamber 14, i.e., an upper end part, and an axis part 32 extending downward from the valve body part 31 and connected to the diaphragm 2. A small-diameter axis part 32a protruding downward from a shoulder surface coming into contact with an upper surface of the diaphragm 2 is provided at a lower end portion of the axis part 32. The governor valve 3 is connected to the diaphragm 2 by passing the small-diameter axis part 32a through a hole opened at a center of the diaphragm 2 and fitting in the valve holder 24. In this connection, an auxiliary axis part 33 extending from the valve body part 31 to an opposite side to the diaphragm 2, i.e., upward, is also provided with the governor valve 3. Further, a stroke of the governor valve 3 in an opening direction is configured to be regulated by contact of the auxiliary axis part 33 with a lid body 17 covering an end surface of an opposite side to the valve seat 15, i.e., an upper surface, of the secondary pressure chamber 14.

The electromagnetic solenoid 4 has a yoke 41 that is attached to a lower surface of the keep plate 21, a coil 43 that is wound around a bobbin 42 in the yoke 41, a plunger 45 that is slidably, in a vertical direction, inserted into a cylindrical guide 44 of an inner circumference of the bobbin 42, and a spring 46 that cancels self-weights of the plunger and the governor valve 3 by upwardly energizing the plunger 45. The plunger 45 comes into contact with a lower end of the small-diameter axis part 32a of the governor valve 3 and presses the governor valve 3 to the upper opening-side with press force in proportion to a flowing current value to the coil 43. As the current value is increased, the governor valve 3 displaces to the opening-side, a clearance (opening degree) between a circumferential surface of the valve hole 16 and the valve body part 31 becomes large and a gas pressure in the secondary pressure chamber 14, i.e., a secondary gas pressure, increases. Accordingly, a gas supply amount to the gas burner varies in proportion to the current value. Additionally, when a gas pressure in the primary pressure chamber 13, i.e., a primary gas pressure fluctuates, the governor valve 3 displaces through the diaphragm 2, the opening degree varies so as to absorb the gas pressure fluctuation, and the fluctuation of the secondary pressure is suppressed. Therefore, even if the fluctuation of the primary gas pressure takes place, the secondary gas pressure is maintained at a predetermined pressure corresponding to the current value.

Incidentally, exterior impact and the like trigger off occurrence of oscillation of the governor valve 3, the oscillation causes the valve body part 31 to come into contact with the valve seat 15, and this contact leads to a sound source. A noise, so-called a governor sound, sometimes takes place due to resonance action resulting from coincidence of a frequency of the sound source with a natural frequency of the secondary pressure chamber 14. Then, in the embodiment, an auxiliary chamber 14b that is divided by a separating wall 141 from a main chamber 14a that is a portion of the secondary pressure chamber 14, to which the valve seat 15 faces, is provided in the secondary pressure chamber 14 and the auxiliary chamber 14b is communicated with the main chamber 14a through a communicating passage 14c. The communicating passage 14c is constituted by a clearance between the lid body 17 and an end edge, i.e., an upper end edge, at a side of the lid body 17 of the separating wall 141.

Thus, in a case where the auxiliary chamber 14b is provided in the secondary pressure chamber 14, the natural frequency of the secondary pressure chamber 14 becomes high and shifts from the frequency of the above-mentioned sound source. Therefore, the governor sound can be suppressed without increase of the number of parts and this is advantageous in terms of cost reduction.

Figure 2:
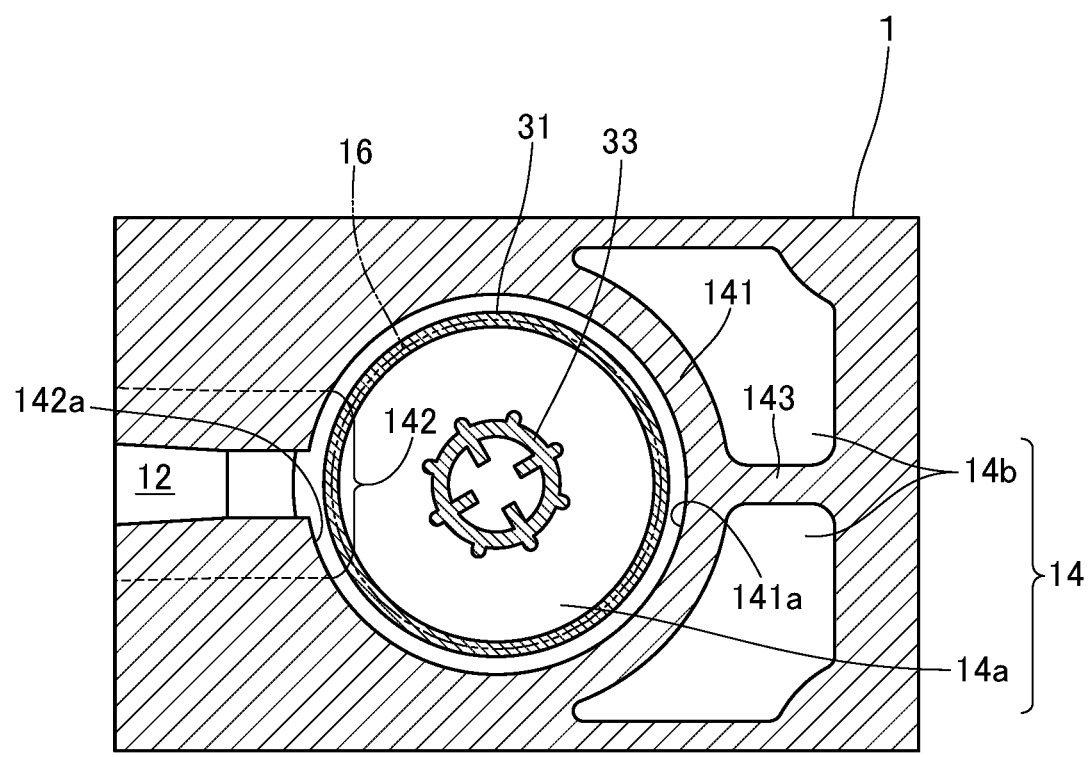
FIG. 2 is a sectional view that is cut off along a II-II line of FIG. 1.

With reference also to FIG. 2, the separating wall 141 is positioned at a portion away in the circumferential direction from the outflow-port opened portion 142 that is the peripheral wall portion of the secondary pressure chamber 14, in which the outflow port 12 is opened. The separating wall 141 is provided so that a distance from the valve hole 16 and a curvature in the circumferential direction of at least an end portion 141a of the separating wall 141, which is close to the valve seat 15, are equal to those of an end portion 142a of the outflow-port opened portion 142, which is close to the valve seat 15. In this connection, in the embodiment, a center in the circumferential direction of the separating wall 141 is away by 180° in the circumferential direction from a center in the circumferential direction of the outflow-port opened portion 142. Additionally, a partition wall 143 that divides the auxiliary chamber 14b into two portions is provided in the middle in the circumferential direction of the auxiliary chamber 14b. Meanwhile, the partition wall 143 is possible to be omitted as shown in a second embodiment below-mentioned.

Thus, in the case where the distance from the valve hole 16 and the curvature in the circumferential direction of the end portion 141a of the separating wall 141, which is close to the valve seat 15, are equal to those of the end portion 142a of the outflow-port opened portion 142, which is close to the valve seat 15, gas flows passing through a clearance between the valve body part 31 of the governor valve 3 and the valve seat 15 become equal over an entire circumference. As a result, such irregular opening and closing movements as the valve body part 31 opens and closes will not take place in the state where the valve body part 31 inclines and instability of the secondary gas pressure will be prevented.

Incidentally, in the case where the communicating passage 14c is constituted by the clearance between the lid body 17 and the upper end edge of the separating wall 141, an influence(s) of a vortex(es) taking place in the auxiliary chamber 14b comes to the outflow port 12 from the communicating passage 14c through the main chamber 14a. Additionally, if a position of the upper end edge of the separating wall 141 is low, a turbulent flow(s) due to the influence(s) of the vortex(es) directing from the communicating passage 14c to the outflow port 12 comes in the vicinity of the valve body part 31 of the governor valve 3 and this sometimes becomes a cause of instability of the secondary gas pressure.

Then, in the embodiment, a position of the upper end edge of the separating wall 141 is the one which is closer to the lid body 17 than a position of an end of the lid-body 17 side, i.e., an upper end, of the outflow port 12. Namely, the upper end edge of the separating wall 141 is positioned above the outflow port 12. According to this, the turbulent flow(s) due to the influence(s) of the vortex(es) directing from the communicating passage 14c to the outflow port 12 is prevented from coming in the vicinity of the valve body part 31 of the governor valve 3 and stability of the secondary gas pressure can be improved.

Figure 3:
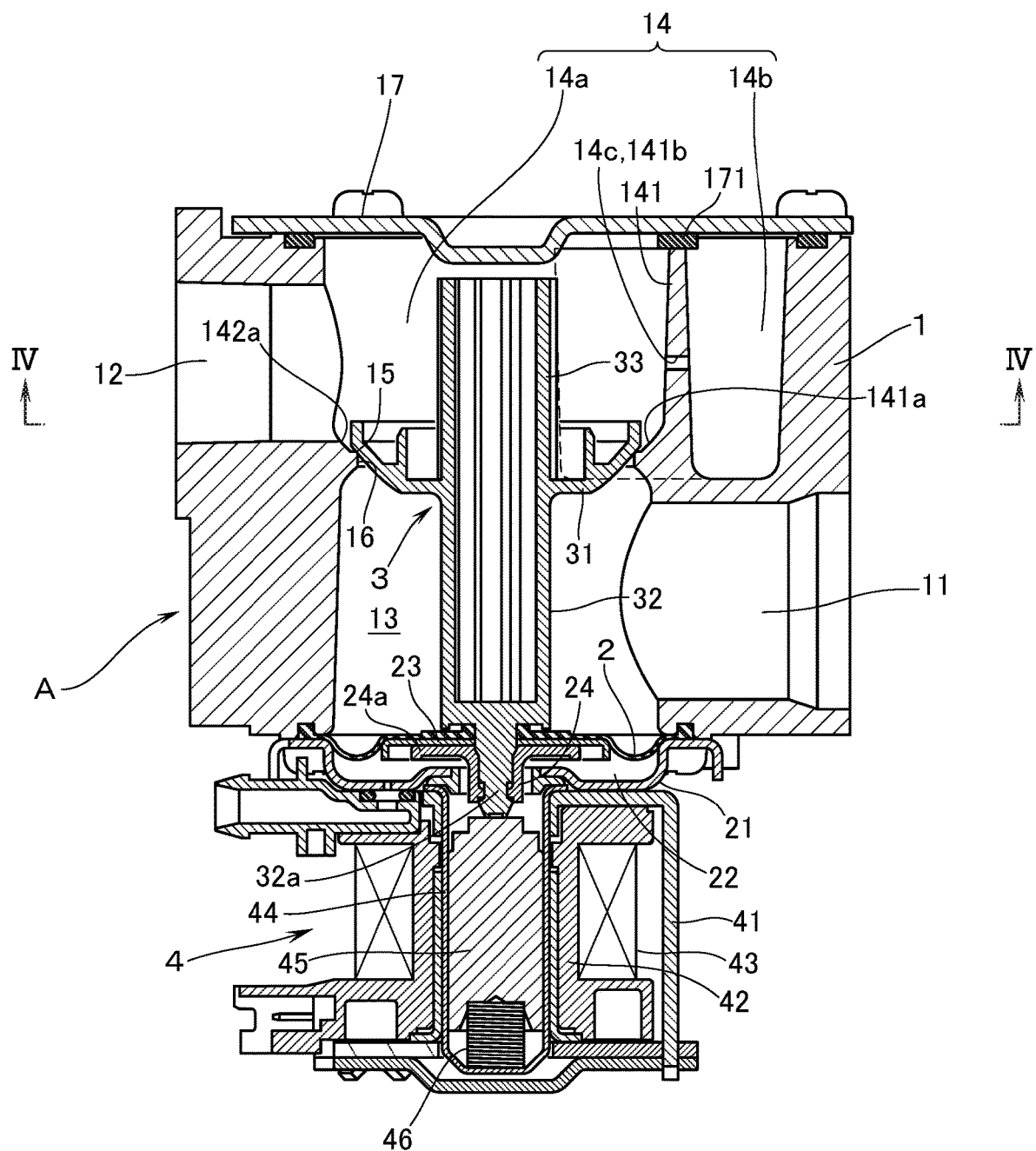
FIG. 3 is a cut-off side view of a proportional valve apparatus with a governor, which is constituted by using a gas governor of a second embodiment of the invention.
Figure 4:
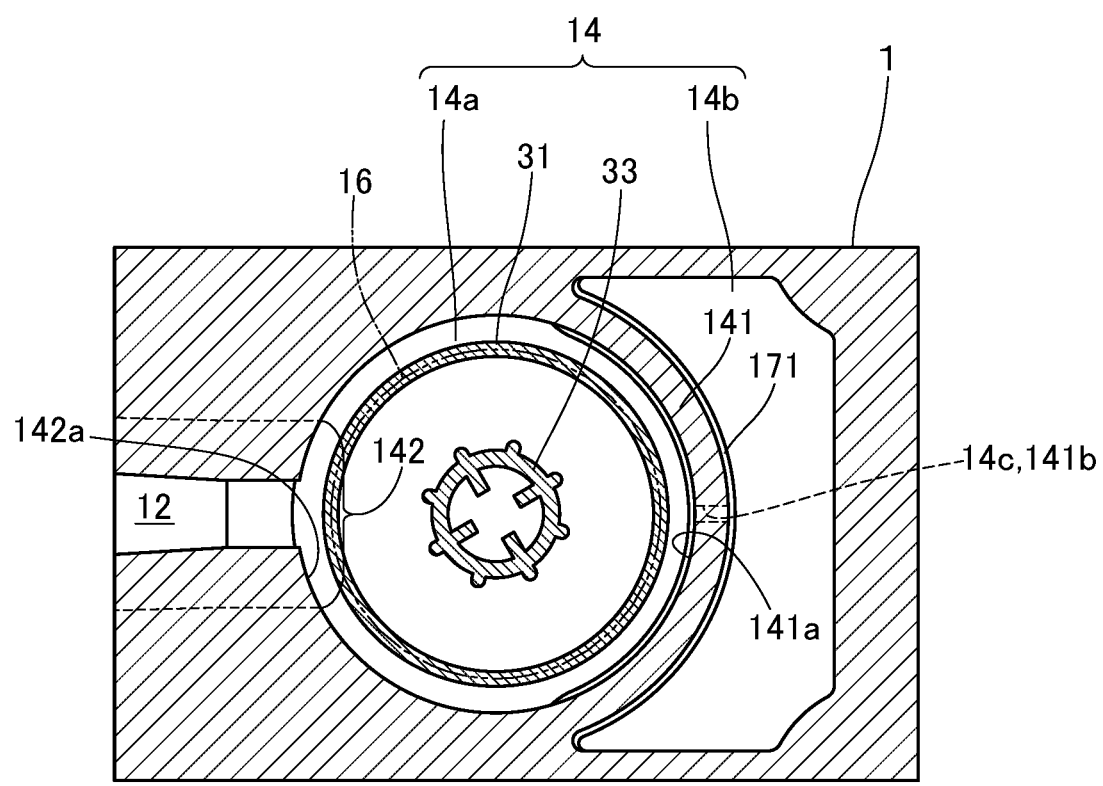
FIG. 4 is a sectional view that is cut off along a IV-IV line of FIG. 3.

Next, a second embodiment that is shown in FIGS. 3, 4 will be explained. A basic structure of the second embodiment is not greatly different from that of the first embodiment, and similar members, parts and portions to those in the first embodiment are marked the same symbols as above-mentioned. Differences of the second embodiment from the first embodiment are that the clearance between the lid body 17 and the upper end edge of the separating wall 141 is closed by causing the upper end of the separating wall 141 to be closely contacted with the lid body 17 through a sealing member(s) 171, the communicating passage 14c communicating the auxiliary chamber 14b with the main chamber 14a is constituted by the through hole 141b with relatively small diameter (for example, in a range of from 1 mm to 2 mm), which is opened in the partition wall 141, and the partition wall 143 in the first embodiment, which divides the auxiliary chamber 14b into two portions, is omitted. By the second embodiment, similar functions and effects to those obtained in the first embodiment are obtained.

In this connection, the through hole 141b is opened by a tool inserted through the outflow port 12 after making the casing 1. Therefore, a position of the through hole 141b becomes below that of the upper end of the outflow port 12. However, if a diameter of the through hole 141b is made to be small, the influence(s) of the vortex(es) in the auxiliary chamber 14b will not come to the main chamber 14a and instability of the secondary gas pressure due to the influence(s) of the vortex(es) will be prevented.

Though the embodiments of the invention are explained referring to figures in the above, the invention is not restricted to the embodiments. For example, though, in the above-mentioned embodiments, a circumferential direction angle between the center in the circumferential direction of the outflow-port opened portion 142 and the center in the circumferential direction of the separating wall 141 is set by 180°, the circumferential direction angle is possible to be set an angle other than 180°, for example, 150°. Additionally, though, in the above-mentioned embodiments, the primary pressure chamber 13 is positioned at the lower side and the secondary pressure chamber 14 at the upper side, by turning upside down, it is possible that the primary pressure chamber 13 is positioned at the upper side and the secondary pressure chamber 14 at the lower side. Further, in the above-mentioned embodiments, though the invention is applied to the gas governor constituting the proportional valve apparatus with the governor, with which the electromagnetic solenoid 4 is provided, the invention is similarly applicable to a regular gas governor without the electromagnetic solenoid 4.

EXPLANATION OF SYMBOLS

A Gas governor
1 Casing
11 Inflow port
12 Outflow port
13 Primary pressure chamber
14 Secondary pressure chamber
14a Main chamber
14b Auxiliary chamber
14c Communicating passage
141 Separating wall
141a End portion of separating wall, which is close to valve seat
141b Through hole
142 Outflow-port opened portion 142a End portion of outflow-port opened portion, which is close to valve seat
15 Valve seat
16 Valve hole
17 Lid body
2 Diaphragm
3 Governor valve
31 Valve body part
32 Axis part

What is claimed is:

1. A gas governor, comprising,
a casing having an inflow port and an outflow port, a primary pressure chamber communicating with the inflow port, a secondary pressure chamber communicating with the outflow port, and a valve seat between the primary pressure chamber and the secondary pressure chamber;
a diaphragm facing to the primary pressure chamber at an opposite side to the valve seat; and
a governor valve that has a valve body part which is inserted into a valve hole opened in the valve seat and of which a diameter is progressively enlarged toward an end part of a side of the secondary pressure chamber;
wherein an axis part of the governor valve, which extends from the valve body part to a side of the diaphragm, is connected to the diaphragm and gas pressure fluctuation in the secondary pressure chamber is configured to be suppressed by displacing the governor valve through the diaphragm corresponding to gas pressure fluctuation in the primary pressure chamber,
wherein:
an auxiliary chamber divided by a separating wall from a main chamber that is a portion of the secondary pressure chamber, to which the valve seat faces, is provided in the secondary pressure chamber, the auxiliary chamber communicates with the main chamber through a communicating passage, the separating wall is positioned at a portion away in a circumferential direction from an outflow-port opened portion that is a peripheral wall portion of the secondary pressure chamber, in which the outflow port is opened, and the separating wall is provided so that a distance from the valve hole and a curvature in the circumferential direction of at least an end portion of the separating wall, which is close to the valve seat, are equal to those of an end portion of the outflow-port opened portion, which is close to the valve seat.

2. The gas governor as claimed in claim 1, wherein the communicating passage is constituted by a clearance between a lid body closing an end surface opposite to the valve seat of the secondary pressure chamber and an end edge of the lid-body side of the separating wall.

3. The gas governor as claimed in claim 2, wherein a position of the end edge of the lid-body side of the separating wall is closer to the lid body than an end of the lid-body side of the outflow port.

4. The gas governor as claimed in claim 1, wherein the clearance between a lid body closing an end surface opposite to the valve seat of the secondary pressure chamber and an end edge of the lid-body side of the separating wall is closed and the communicating passage is constituted by a through hole opened in the separating wall.

\* \* \* \* \*